(12) United States Patent
Kawaoka

(10) Patent No.: US 8,311,393 B2
(45) Date of Patent: Nov. 13, 2012

(54) IMAGE EDITING APPARATUS AND METHOD

(75) Inventor: Yoshiki Kawaoka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1752 days.

(21) Appl. No.: 10/446,853

(22) Filed: May 29, 2003

(65) Prior Publication Data
US 2003/0231862 A1    Dec. 18, 2003

(30) Foreign Application Priority Data

May 30, 2002    (JP) .................................. 2002-156656

(51) Int. Cl.
H04N 5/93 (2006.01)
H04N 1/00 (2006.01)
H04N 1/46 (2006.01)
H04N 1/387 (2006.01)
H04N 5/77 (2006.01)
H04N 5/78 (2006.01)
H04N 5/84 (2006.01)
H04N 5/225 (2006.01)
G06F 7/00 (2006.01)
G06F 11/30 (2006.01)
G06K 1/00 (2006.01)
G06K 9/36 (2006.01)

(52) U.S. Cl. .......... 386/288; 386/25; 386/280; 386/281; 386/324; 386/333; 345/555; 348/335; 358/1.12; 358/1.18; 358/403; 358/406; 358/450; 358/537; 358/538; 382/232; 382/233; 701/35

(58) Field of Classification Search ................. 382/232, 382/233; 386/4, 52, 55, E9.036, 95, 120, 386/121, E5.072; 345/555; 358/537, 538, 358/1.18, 1.2, 473, 474, 1.12, 403, 450, 1.13, 358/1.14, 906, 406; 707/200; 340/438, 439, 340/937; 348/700, 335, E5.053; 399/401; 701/28, 29, 35; 715/723, 835; 375/E7.081, 375/E7.263

See application file for complete search history.

(56) References Cited

U.S. PATENT DOCUMENTS 4,760,458 A * 7/1988 Watanabe et al. ............. 358/537

(Continued)

FOREIGN PATENT DOCUMENTS

JP    3-1783 A    1/1991

(Continued)

OTHER PUBLICATIONS

Notice of Reasons for Rejection, dated Jan. 9, 2009, issued in corresponding JP application No. 2002-156656, 5 pages in English and Japanese.

Primary Examiner — Thai Tran
Assistant Examiner — Syed Hasan
(74) Attorney, Agent, or Firm — Sughrue Mion, PLLC

(57) ABSTRACT

The motion picture image print apparatus extracts a plurality of frames from recorded motion picture data for printing, the apparatus enabling the range of loaded images to be determined from images reproduced on a screen, not from the results of measurement of time, thus allowing a desired print to be more easily obtained. An operator reads motion picture image data recorded on a recording medium. The operator then sets a layout of a print output and the number of image frames in the print output to display a list of motion picture image files on a list screen, thereby selecting motion picture image file to be printed. The operator then depresses a motion picture control button to reproduce the selected motion picture image file in the check area. While viewing the reproduced images, the operator sets at least either a print starting image or a print ending image by depressing a "From" button or a "To" button, respectively. Thus, images corresponding to a predetermined number of frames are extracted from the set range of images at equal intervals. The extracted images are edited so as to be arranged in the set layout and are then printed.

17 Claims, 6 Drawing Sheets

U.S. PATENT DOCUMENTS

| | | | | |
|---|---|---|---|---|
| 5,708,515 A * | 1/1998 | Nishiura | ...................... | 358/473 |
| 5,963,204 A * | 10/1999 | Ikeda et al. | ................... | 715/723 |
| 6,246,933 B1 * | 6/2001 | Bague | ......................... | 701/32.2 |
| 6,393,252 B1 * | 5/2002 | Yamagishi | ................... | 399/401 |
| 6,571,054 B1 * | 5/2003 | Tonomura et al. | ............ | 386/241 |
| 6,618,491 B1 * | 9/2003 | Abe | ............................. | 382/107 |
| 6,690,878 B1 * | 2/2004 | Jeong et al. | ..................... | 386/52 |
| 6,856,422 B1 * | 2/2005 | Higashibata et al. | ......... | 358/1.18 |
| 7,035,469 B2 * | 4/2006 | Laaksonen | ................... | 382/232 |
| 2002/0080425 A1 * | 6/2002 | Itokawa | ........................ | 358/496 |
| 2003/0016376 A1 * | 1/2003 | Narushima | .................. | 358/1.13 |
| 2003/0097377 A1 * | 5/2003 | Yahara et al. | ................. | 707/200 |
| 2003/0117651 A1 * | 6/2003 | Matraszek et al. | ........... | 358/1.18 |

FOREIGN PATENT DOCUMENTS

| | | |
|---|---|---|
| JP | 6-334954 A | 12/1994 |
| JP | 10-277195 | 10/1998 |
| JP | 2833010 B | 10/1998 |
| JP | 2002-19213 A | 1/2002 |
| JP | 2002-112169 A | 4/2002 |

\* cited by examiner

FIG.2

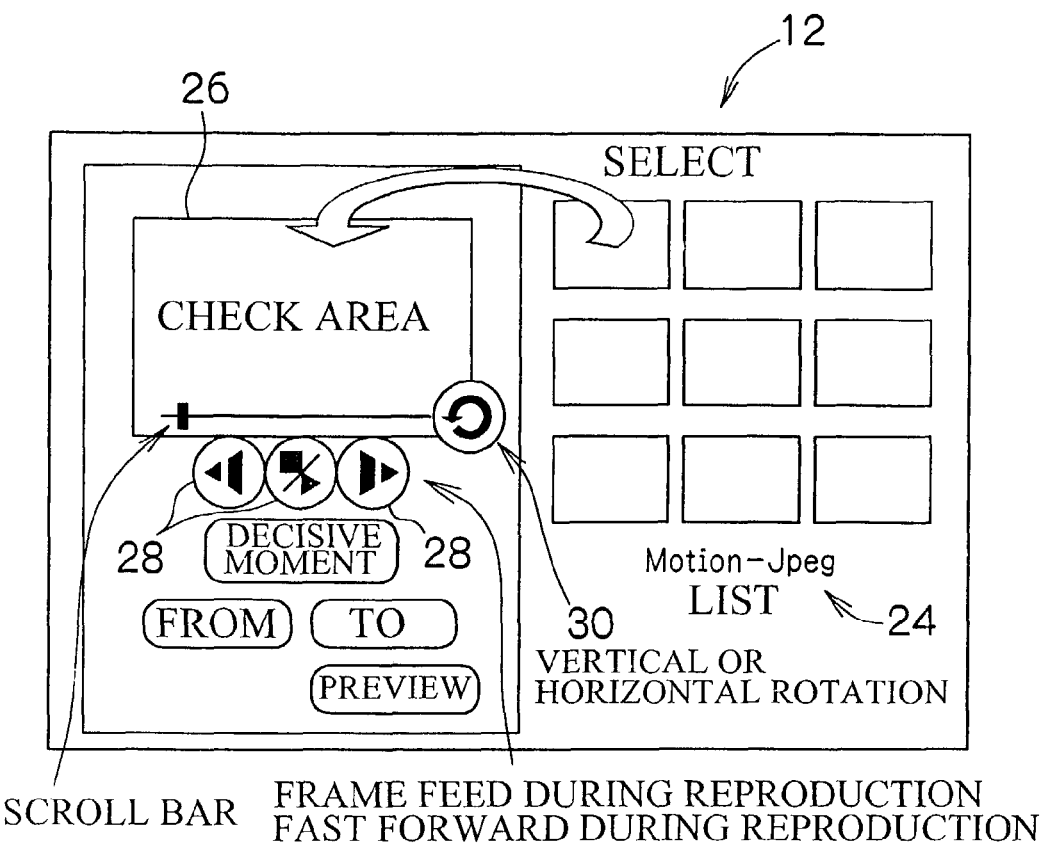

1 SELECT MOTION PICTURE FROM LIST SCREEN →
START REPRODUCTION IN CHECK AREA
2 USE MOTION PICTURE CONTROL BUTTONS TO START,
STOP, FAST-FORWARD, OR RETURN OPERATION
3 USE "FROM" AND "TO" BUTTONS TO
SET START AND END POINT TIMINGS FOR ACTUAL PRINTING
IF START AND END POINTS ARE NOT SPECIFIED,
START AND END OF FILE ARE SET AS THESE POINTS
4 USE "PREVIEW" BUTTON TO CHECK LAID-OUT PRINT

FIG.6

<SECOND EMBODIMENT> (EXAMPLE: GOLF MODE)

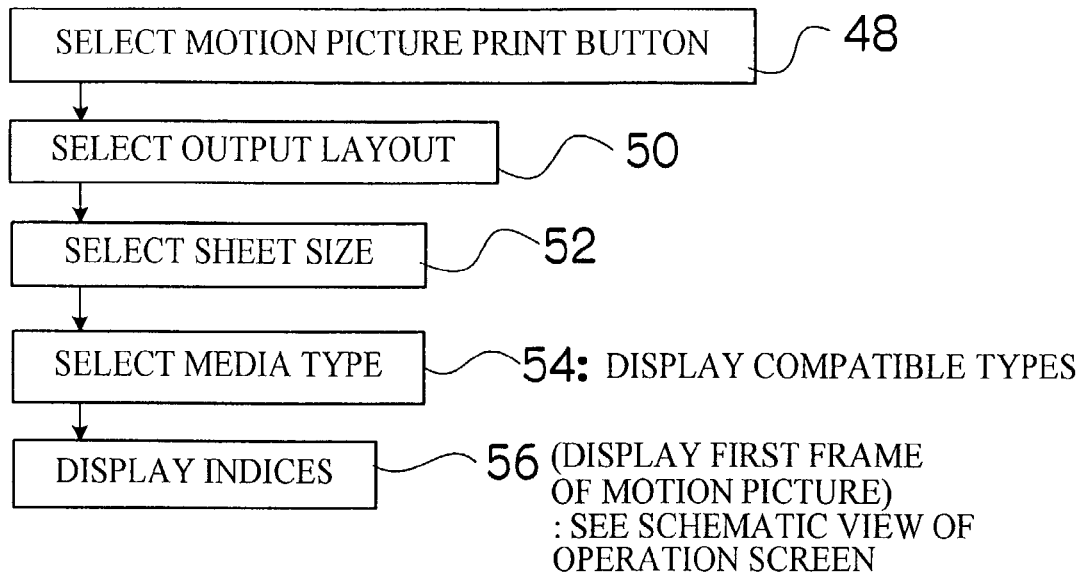

SELECT INDEX TO REPRODUCE AND CHECK FRAME

SEVERAL FRAMES CAN BE SELECTED (WHEN FRAME IS SELECTED WHILE ANOTHER FRAME IS BEING REPRODUCED, NEWLY SELECTED MOTION PICTURE IS REPRODUCED FOR CHECK)

SPECIFY DECISIVE MOMENT IMAGE

SPECIFY CENTRAL IMAGE OF FRAMES TO BE PRINTED
EXTRACT AND ADJUST FRAMES SO THAT SPECIFIED IMAGE IS PRINTED
SET FRAMES CORRESPONDING TO PREDETERMINED TIME BEFORE AND AFTER CENTRAL IMAGE, AS PRINT TARGETS

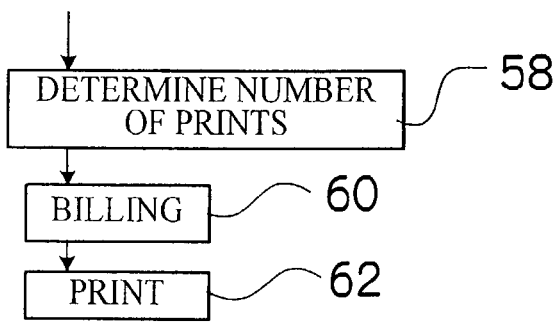

IMAGE EDITING APPARATUS AND METHOD

BACKGROUND OF THE INVENTION

1. Field of the Invention

The present invention relates to an image editing apparatus and method that edits continuous images such as motion pictures or continuous photograph images picked up by a video camera, a digital camera, or a mobile telephone with a camera.

2. Description of the Related Art

Japanese Patent No. 2833010 discloses a method of decomposing motion picture images picked up by an image pickup device such as a video camera, a digital camera, or a mobile telephone with a camera into still images for printing. This publication describes a print apparatus which loads a motion picture video from VTR or the like in the form of a plurality of frames and which prints the video as decomposed photographs. In connection with the loading of a plurality of frames for printing, the publication describes a method of specifying the time for which the desired video is to be loaded and the number of frames to be loaded so as to load a required number of images for the decomposed photographs in response to an operator's instruction to start loading.

However, for some motion picture scenes, it is unknown how long it takes to load scenes from which decomposed photographs are to be obtained.

Japanese Patent Application Publication No. 6-334954 describes a video printer which can print multi-stroboscopic images and which enables the selection of the first and last frames of multi-stroboscopic images to be printed.

Japanese Patent Application Publication No. 2002-19213 describes a printer which can print a plurality of images on a sheet and which allows a user to select a layout of the images.

However, actually, it has been strongly desirable to edit and print the most desirable image portion of reproduced motion picture scenes together with its preceding and succeeding images.

SUMMARY OF THE INVENTION

In view of these circumstances, it is an object of the present invention to provide an image editing apparatus and method that extracts and edits a plurality of frames from recorded continuous image data and which enables the range of loaded images to be determined from images reproduced on a screen, not from the results of measurement of time, thus allowing a desired print to be more easily obtained.

According to a first aspect of the present invention, there is provided an image editing apparatus which edits continuous image data recorded on a recording medium, the apparatus comprising:

a continuous image data reading device which reads continuous image data recorded on the recording medium;

a layout setting device which sets an image edition layout of continuous images and the number of image edition frames for the continuous images;

an image display device which displays a list of one or more continuous image files recorded on the recording medium;

a continuous image file selecting device which selects a continuous image file;

an edited image setting device which enables setting of at least one of an edition starting image and an edition ending image from the selected continuous image file;

an edited image extracting device which extracts images corresponding to the set number of frames from a range of images set by the edited image setting device; and an image arrangement editing device which edits the images extracted by the edited image extracting device so as to arrange the images in the set layout.

According to the first aspect of the present invention, the continuous image data reading device reads continuous image data recorded on the recording medium, and the layout setting device sets an image edition layout of continuous images and the number of image edition frames for the continuous images. The image display device displays a list of one or more continuous image files recorded on the recording medium. The phrase "one or more" means that if a plurality of continuous image files are recorded, a list of these files is displayed. The continuous image file selecting device selects a continuous image file to be edited from the list of continuous image files.

The edited image setting device enables the setting of at least either an edition starting image or an edition ending image from the continuous image file selected by the continuous image file selecting device. Accordingly, only the edition starting or ending image or both can be set. If only the edition starting image is set, the images starting with this edition starting image and ending with the last image of the file are edited. If only the edition ending image is set, the images starting with the first image of the file and ending with this edition ending image are edited. It is also possible to set neither the edit starting image nor the edit ending image. However, in this case, all images in the file are edited.

The edited image extracting device extracts images to be edited, corresponding to the number of frames set by the layout setting device, from the range of images set by the edited image setting device. The predetermined number of frames may be extracted from the set range of images at equal intervals or by weighting particular scenes within the set range of images.

The image arrangement editing device edits the images extracted by the edited image extracting device so as to arrange the images in the layout set by the layout setting device.

The first aspect of the present invention can exist as an image editing method for operations performed by the above image editing apparatus. It can also exist as a program for allowing a computer to perform these operations.

According to a second aspect of the present invention, an image editing apparatus which edits continuous image data recorded on a recording medium, the apparatus comprising:

a continuous image data reading device which reads continuous image data recorded on the recording medium;

a layout setting device which sets an image edition layout of continuous images and the number of image edition frames for the continuous images;

an image display device which displays a list of one or more continuous image files recorded on the recording medium;

a continuous image file selecting device which selects a continuous image file;

an edited image setting device which enables setting of at least a particular image to be edited from the selected continuous image file;

an edited image extracting device which extracts images corresponding to the set number of frames and including the particular image set by the edited image setting device; and an image arrangement editing device which edits the images extracted by the edited image extracting device so as to arrange the images in the set layout.

According to the second aspect of the present invention, the operations performed by the continuous image data reading device, layout setting device, image display device, and continuous image file selecting device are similar to those described in the first aspect.

The edited image setting device enables the setting of at least a particular image to be edited from the continuous image file selected by the continuous image file selecting device.

The edited image extracting device extracts images to be edited, corresponding to the number of frames set by the layout setting device and including the particular image set by the edited image setting device. It is possible to extract frames which precede and succeed a particular image to be edited and which correspond to a predetermined time, or frames which precede or succeed the particular image to be edited and which correspond to the predetermined time.

The image arrangement editing device edits the images extracted by the edited image extracting device so as to arrange the images in the layout set by the layout setting device.

The second aspect of the present invention can exist as an image editing method for operations performed by the above image editing apparatus. It can also exist as a program for allowing a computer to perform these operations.

According to a third aspect of the present invention, there is provided an image editing apparatus which edits continuous image data recorded on a recording medium, the apparatus comprising:

a continuous image data reading device which reads continuous image data recorded on the recording medium;

a layout setting device which sets an image edition layout of continuous images and the number of image edition frames for the continuous images;

an image display device which displays a list of one or more continuous image files recorded on the recording medium;

a continuous image file selecting device which selects a continuous image file;

an edited image setting device which enables setting of at least either an edition starting image or an edition ending image from the selected continuous image file and which enables setting of at least a particular image to be edited within a set range of images;

an edited image extracting device which extracts, if the particular image to be edited has been selected, images which correspond to the set number of frames and which include the particular image within the range set by the edited image setting device; and an image arrangement editing device which edits the images extracted by the edited image extracting device so as to arrange the images in the set layout.

According to the third aspect of the present invention, the operations performed by the continuous image data reading device, layout setting device, image display device, and continuous image file selecting device are similar to those described in the first aspect.

The edited image setting device enables the setting of at least either an edition starting image or an edition ending image from the continuous image file selected by the continuous image file selecting device, and enables the setting of at least a particular image to be edited within the set range of images. Accordingly, only the edition starting or ending image or both can be set. If only the edition starting image is set, the images starting with this edition starting image and ending with the last image of the file are edited. If only the edition ending image is set, the images starting with the first image of the file and ending with this edition ending image are edited. It is also possible to set neither the edit starting image nor the edit ending image. However, in this case, all images in the file are edited. Alternatively, at least a particular image to be edited can be set within the range set for the edition starting and ending images. The particular image to be edited may or may not be set.

If the particular image to be edited has been selected, the edited image extracting device extracts images to be edited, which correspond to the number of frames set by the layout setting device and which include the particular image within the range set by the edited image setting device. The images corresponding to the predetermined number of frames may be extracted by weighting images preceding or succeeding the particular image.

The image arrangement editing device edits the images extracted by the edited image extracting device so as to arrange the images in the layout set by the layout setting device.

The third aspect of the present invention can exist as an image editing method for operations performed by the above image editing apparatus. It can also exist as a program for allowing a computer to perform these operations.

With respect to the first to third aspects of the present invention, the computer executing the above-described operations includes any types of computers and can be an image controller of which main purpose is to edit images.

According to a fourth aspect of the present invention, there is provided a motion picture image print apparatus which prints digital motion picture image data recorded on a recording medium, the apparatus comprising:

a motion picture image data reading device which reads digital motion picture image data recorded on the recording medium;

a print layout setting device which sets a layout of a print output and the number of frames in the print output;

an image display device which displays a list of one or more motion picture image files recorded on the recording medium;

a motion picture image file selecting device which selects a motion picture image file to be printed;

a printed image setting device which enables setting of at least one of a print starting image and a print ending image from the selected motion picture image file;

a printed image extracting device which extracts images corresponding to a set number of frames from a range of images set by the printed image setting device;

an image arrangement editing device which edits the images extracted by the printed image extracting device so as to arrange the images in the set layout; and an image print device which prints the edited images.

According to the fourth aspect of the present invention, the motion picture image data reading device reads digital motion picture image data recorded on the recording medium, and the print layout setting device sets the layout of a print output and the number of image frames in the print output. The image display device displays a list of one or more motion picture image files recorded on the recording medium. The phrase "one or more" means that if a plurality of motion picture image files are recorded, a list of these files is displayed. The motion picture image file selecting device selects a motion picture image file to be printed from the list of motion picture image files.

The printed image setting device enables the setting of at least either a print starting image or a print ending image from the motion picture image file selected by the motion picture image file selecting device. Accordingly, only the print starting or ending image or both can be set. If only the print starting image is set, the images starting with this print starting image and ending with the last image of the file are printed. If only the print ending image is set, the images starting with the first image of the file and ending with this print ending image are printed. It is also possible to set neither the print starting image nor the print ending image. However, in this case, all images in the file are printed.

The printed image extracting device extracts images to be printed, corresponding to the number of frames set by the print layout setting device, from the range of images set by the printed image setting device. The predetermined number of frames may be extracted from the set range of images at equal intervals or by weighting particular scenes within the set range of images.

The image arrangement editing device edits the images extracted by the printed image extracting device so as to arrange the images in the layout set by the print layout setting device. The image print device prints the images edited by the image arrangement editing device.

According to a fifth aspect of the present invention, there is provided a motion picture image print apparatus which prints digital motion picture images data recorded on a recording medium, the apparatus comprising:

a motion picture image data reading device which reads digital motion picture image data recorded on the recording medium;

a print layout setting device which sets a layout of a print output and the number of frames in the print output;

an image display device which displays a list of one or more motion picture image files recorded on the recording medium;

a motion picture image file selecting device which selects a motion picture image file to be printed;

a printed image setting device which enables setting of at least a particular image to be printed from the selected motion picture image file;

a printed image extracting device which extracts images corresponding to the set number of frames and including the particular image set by the printed image setting device;

an image arrangement editing device which edits the images extracted by the printed image extracting device so as to arrange the images in the set layout; and an image print device which prints the edited images.

According to the fifth aspect of the present invention, the operations performed by the motion picture image data reading device, print layout setting device, image display device, and motion picture image file selecting device are similar to those described in the fourth aspect.

The printed image setting device enables the setting of at least a particular image to be printed from the motion picture image file selected by the motion picture image file selecting device.

The printed image extracting device extracts images to be printed, corresponding to the number of frames set by the print layout setting device and including the particular image set by the printed image setting device. It is possible to extract frames which precede and succeed a particular image to be printed and which correspond to a predetermined time, or frames which precede or succeed the particular image to be printed and which correspond to the predetermined time.

The image arrangement editing device edits the images extracted by the printed image extracting device so as to arrange the images in the layout set by the print layout setting device. The image print device prints the images edited by the image arrangement editing means.

According to a sixth aspect of the present invention, there is provided a motion picture image print apparatus which prints digital motion picture images data recorded on a recording medium, the apparatus comprising:

a motion picture image data reading device which reads digital motion picture image data recorded on the recording medium;

a print layout setting device which sets a layout of a print output and the number of frames in the print output;

an image display device which displays a list of one or more motion picture image files recorded on the recording medium;

a motion picture image file selecting device which selects a motion picture image file to be printed;

a printed image setting device which enables setting of at least one of a print starting image and a print ending image from the selected motion picture image file and which enables setting of at least a particular image to be printed within a set range;

a printed image extracting device which extracts, if the particular image to be printed has been selected, images which correspond to the set number of frames and which include the particular image within the range set by the printed image setting device; and an image arrangement editing device which edits the images extracted by the printed image extracting device so as to arrange the images in the set layout; and an image print device which prints the edited images.

According to the sixth aspect of the present invention, the operations performed by the motion picture image data reading device, print layout setting device, image display device, and motion picture image file selecting device are similar to those described in the fourth aspect.

The printed image setting device enables the setting of at least either a print starting image or a print ending image from the motion picture image file selected by the motion picture image file selecting device, and enables the setting of at least a particular image to be printed within the set range of images. Accordingly, only the print starting or ending image or both can be set. If only the print starting image is set, the images starting with this print starting image and ending with the last image of the file are printed. If only the print ending image is set, the images starting with the first image of the file and ending with this print ending image are printed. It is also possible to set neither the print starting image nor the print ending image. However, in this case, all images in the file are edited. Alternatively, at least a particular image to be printed can be set within the range set for the print starting and ending images. The particular image to be printed may or may not be set.

If the particular image to be printed has been selected, the printed image extracting device extracts images to be printed, which correspond to the number of frames set by the print layout setting device and which include the particular image within the range set by the printed image setting device. The images corresponding to the predetermined number of frames may be extracted by weighting images preceding or succeeding the particular image.

The image arrangement editing device edits the images extracted by the printed image extracting device so as to arrange the images in the layout set by the print layout setting device. The image print device prints the images edited by the image arrangement editing device.

According to the first to sixth aspects of the present invention, those of the continuous images or motion pictures which are to be edited or printed can be determined using reproduced images on a screen. Thus, desired edition results or prints can be more easily obtained.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a view showing an operation section and a display screen on a touch panel monitor;

FIG. 6 is a flow chart showing a procedure of using the printer to print still images preceding and succeeding a desired decisive moment on the basis of motion picture image data.

DETAILED DESCRIPTION OF THE PREFERRED EMBODIMENTS

With reference to the accompanying drawings, detailed description will be given of a first embodiment of a motion picture image print apparatus according to the present invention. In the present embodiment, description will be given of an example in which desired still images are printed which belong to digital motion picture image data obtained using a digital camera and recorded in motion JPEG form.

Figure 1:
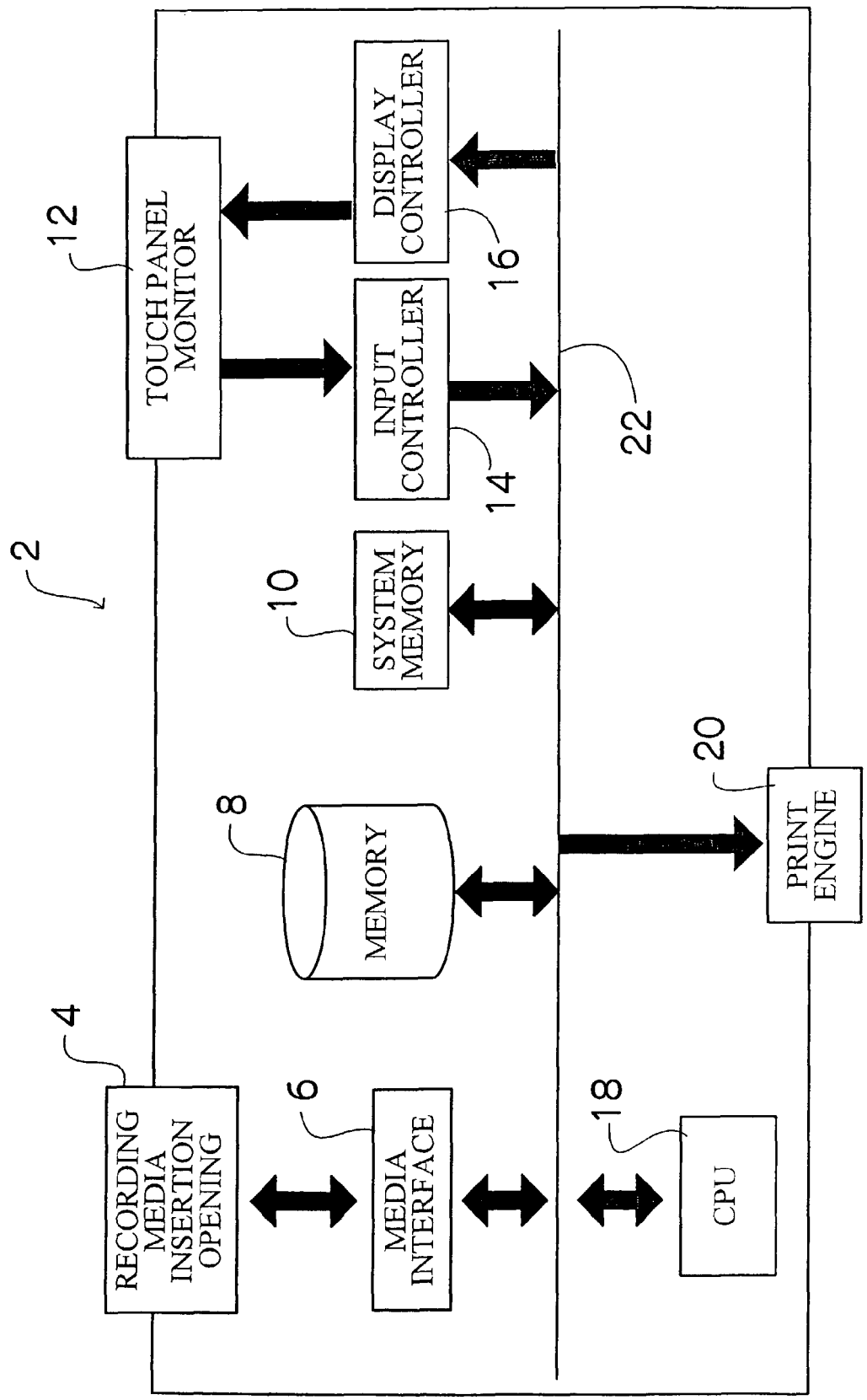
FIG. 1 is a block diagram showing the configuration of a printer according to the present invention.
Figure 3A:
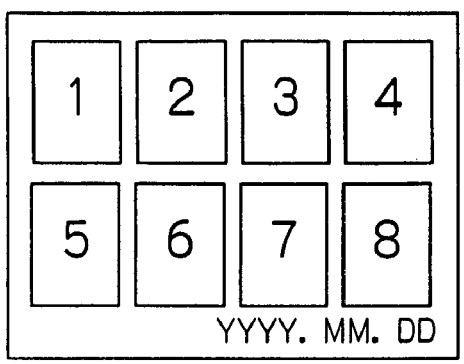
FIGS. 3(a) to 3(d) are views showing the format of an output layout.
Figure 3C:
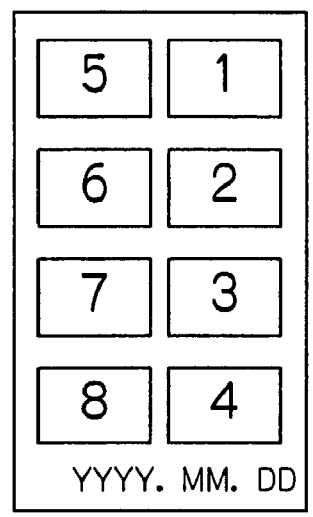
Figure 3B:
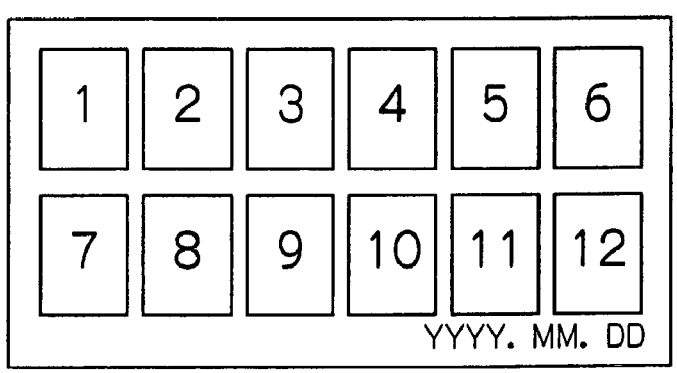
Figure 3D:
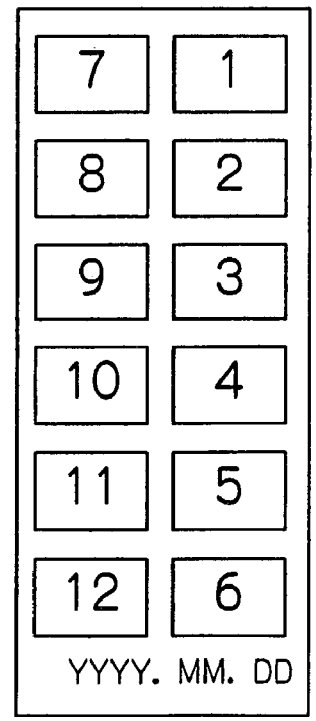

FIG. 1 is a block diagram showing the configuration of a printer 2 according to the present invention.

As shown in this figure, the printer 2 is mainly composed of a recording media insertion opening 4, a media interface 6, a memory 8, a system memory 10, a touch panel monitor 12, an input controller 14, a display controller 16, a CPU 18, a print engine 20, and a bus 22.

The printer 2 has the recording media insertion opening 4 into which a recording medium used in a digital camera is inserted. The printer 2 is adapted to load a motion picture image file from the recording medium inserted into the recording media insertion opening 4.

After the recording medium has been inserted into the recording media insertion opening 4, a motion picture image file recorded on the recording media is transmitted to a desired section via the media interface 6 and the bus 22 according to an instruction given by the CPU 18. The memory 8 temporarily stores image data in order to generate displayed image data or printed image data. The system memory 10 is composed of a ROM or the like so that system files are saved to the system memory 10. The touch panel monitor 12 has an operation section and a display screen (for the details, see FIG. 2). The display controller 16 displays images on the display screen. The operation section of the touch panel monitor 12 is operated to activate the input controller 14 to perform an input operation. The CPU 18 carries out various types of control and expands image data compressively recorded in motion JPEG form. The print engine 20 carries out printing.

FIG. 2 is a view showing the operation section and display screen on the touch panel monitor 12. A list screen 24 is formed in the right of the touch panel monitor 12 to display a list of motion picture image files. A check area 26 is formed in the upper left of the touch panel monitor 12 to carry out the reproducible display of a selected motion picture image file, and the like. A scroll bar is provided at the bottom of the check area 26 to show, during reproduction, a part of the entire motion picture image file in which a scene being displayed is located. Motion picture control buttons 28 are formed below the check area 26. The motion picture control buttons 28 include a return, start/stop, and fast-forward buttons. A frame feed mode is entered by depressing the fast-forward button while the screen is stopped. A fast-forward mode is entered by depressing the fast-forward button while reproduction is being carried out on the screen. A rotation button 30 is formed in the lower right corner of the check area 26. A displayed image is vertically or horizontally rotated by operating the rotation button 30.

A "Decisive Moment" button, a "From" button, a "To" button, and a "Preview" button are formed below the motion picture control buttons 28. When an image displayed in the check area 26 is to be specified as a print target, the "Decisive Moment" button is depressed to accomplish this operation. The "From" button and the "To" button are used to set timings for the start and end points of actual printing, respectively. If the start and end points are not set, it is assumed that the start and end of the selected motion picture image file have been selected. It is also possible to depress both "Decisive Moment" button and at least one of the "From" and "To" buttons. In this case, the range of images specified by the "From" and "To" buttons and including the particular image set by the "Decisive Moment" button is a print target. Depressing the "Preview" button enables a laid-out print to be checked before actual printing.

An operation button (not shown) can be used to set the layout of a print output and the number of frames in the output. Since the formats of layouts for which the corresponding numbers of frames are shown have already been stored in the system memory 10, the operation button is operated to select one of the formats in which images are to be printed. To execute this selection, the layout formats are displayed in the check area 26 to select a desired one.

Figure 5:
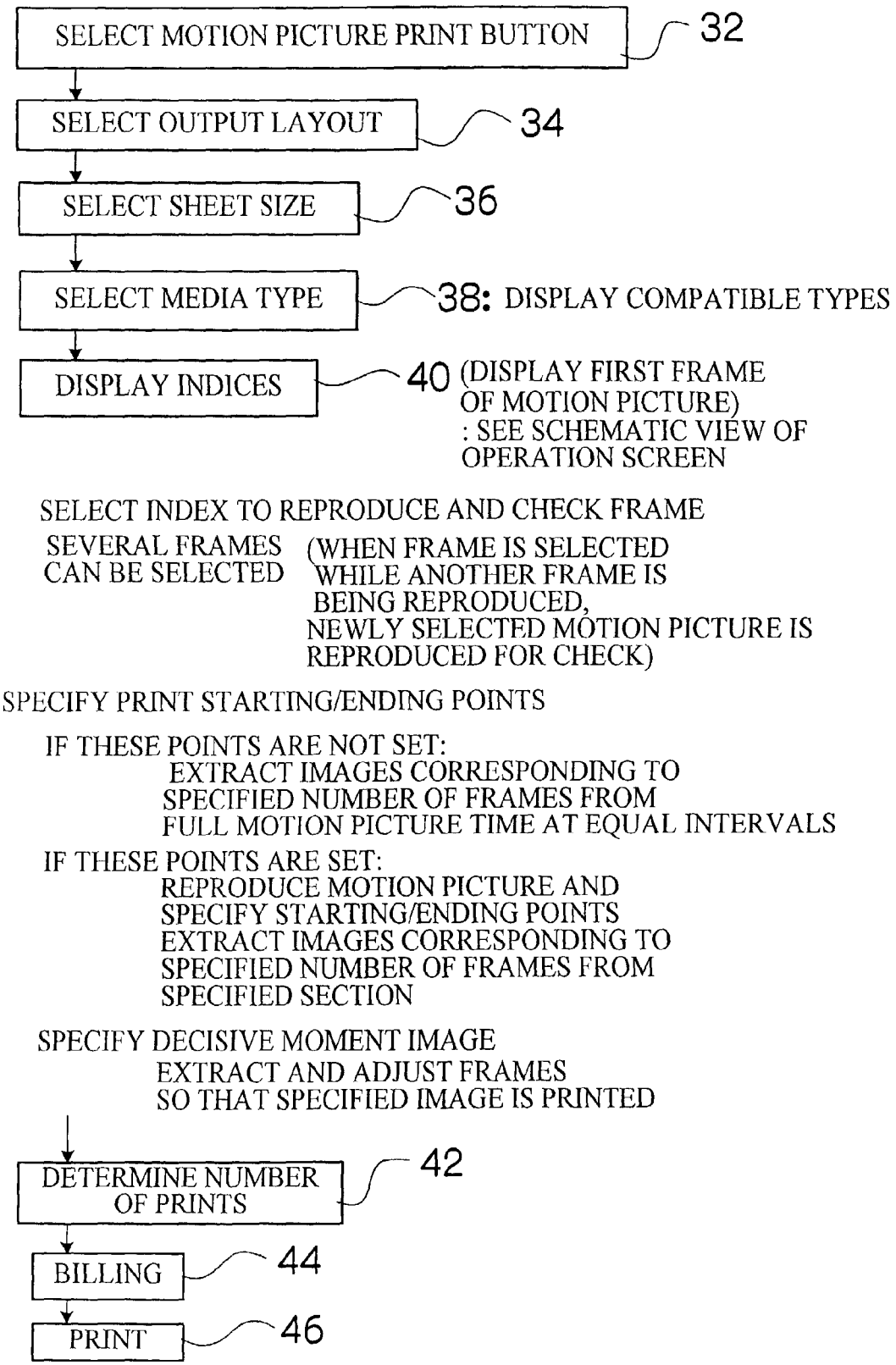
FIG. 5 is a flow chart showing a procedure of using a printer to print still images within a desired specified section on the basis of motion picture image data.

Description will be given of a procedure of using the printer 2, used at a print shop, to print desired still images contained in motion picture image data. FIG. 5 is a flow chart showing a procedure of using the printer 2 to print desired still images contained in motion picture image data. This example is suitable for printing motion picture image data obtained by photographing scenes of skiing or an athletic meet. In the present embodiment, motion pictures are obtained using a digital camera and recorded in motion JPEG form. Accordingly, the motion pictures are established by reproducing still images like electronic picture cards illustrating a story.

First, an operator selects a motion picture print button (not shown) of the printer 2 to set the printer 2 in a mode for motion picture printing (step 32).

The operator then operates the operation button (not shown) to select an output layout (step 34). Several output layout formats are already stored in the system memory 10 as described above. For example, the formats shown in FIGS. 3(a) to 3(d) are stored. In addition to the examples shown in FIGS. 3(a) to 3(d), vertical or horizontal formats showing 10 or 16 images may be provided. The date on which the images were photographed is printed in the margin of each format.

The operator then selects a sheet size (step 36). The provided sheet sizes include, for example, L, 2L, and 3L.

The operator then selects a type of recording medium (step 38). Compatible types are displayed in the check area 26. Thus, the operator selects one of them by operating an operation button (not shown).

When the operator inserts a recording medium into the recording media insertion opening 4, the indices of the motion picture image files recorded in the recording medium are displayed on the list screen 24 (step 40). The first frame of each motion picture image file is displayed on the list screen 24.

The operator uses an operation button (not shown) to select a motion picture image file to be printed, using its index. Then, the operator depresses the motion picture control button 28 to reproduce the selected motion picture image file to check its contents. The indices can be used to select a plurality of motion picture image files. When a motion picture image file is selected while another motion picture image file is being reproduced, the newly selected motion picture image file is reproduced for a check.

While the motion picture image file is being reproduced, the operator specifies a print starting and ending points by depressing the "From" and "To" buttons. After the specification, images are extracted at equal intervals for printing which correspond to the number of frames in the layout already selected from within the specified section. The other images are not extracted. If the print starting and ending points are not specified, the full motion picture time is specified. Then, images corresponding to a predetermined number of frames are extracted from the full motion picture time at equal intervals. The remaining frames are not extracted. The predetermined number of frames may be extracted by weighting a scene starting with a print starting point, with the remaining frames not extracted.

If a decisive moment image (for example, a scene in which a skier is turning or the moment when someone running a race of an athletic meet reaches the finish line) is to be specified for printing after the print starting and ending points have been specified, then the operator depresses the "Decisive Moment" button within the specified section to extract an image so that the specified image can be printed. Further, several images preceding and succeeding the "Decisive Moment" image are weighted and extracted, with the remaining images not extracted for frame adjustment. In this regard, even if the print starting and ending points are not specified, the full motion picture time is divided into equal sections as in the case in which they are selected as described previously. Thus, on the basis of these sections, an image is specified as a decisive moment image and extracted for printing. Further, several images preceding and succeeding the "Decisive Moment" image are weighted and extracted, with the remaining images not extracted for frame adjustment.

The extracted images are edited on the memory 8 so as to conform to the already selected layout, on the basis of an instruction from the CPU 18 and according to software in the system memory 10. The operator depresses the preview button as required to check in the check area 26 how the images are printed. The operator then determines the number of prints (step 42), and a billing procedure is executed (step 44). Then, the edited image data is transferred to the print engine 20 for printing (step 46).

According to the printer of the first embodiment, decomposed image prints of desired scenes are easily obtained while viewing images reproduced on the screen on the basis of digital motion picture image data. The motion picture photographer can enjoy prints in a new way.

A second embodiment will be described with reference to FIG. 6. The printer 2 and touch panel monitor 12 used in the present embodiment are similar to those in the first embodiment. Accordingly, their description will be omitted.

FIG. 6 is a flow chart showing a procedure of using the printer 2, used at a print shop, to print a still image from motion picture image data which image corresponds to the desired decisive moment. This example is suitable for printing, for example, motion picture image data obtained by photographing scenes of a golf swing. Also in the present embodiment, motion pictures are obtained using a digital camera and recorded in motion JPEG form.

Steps 48 to 54 are similar to steps 32 to 38 in the first embodiment. Accordingly, their description will be omitted.

When a recording medium is inserted into the recording media insertion opening 4, the indices of the motion picture image files recorded in the recording medium are displayed on the list screen 24 (step 56). The list screen 24 displays the first frame of each of the motion picture image files.

The operator uses an operation button (not shown) to select a motion picture image file to be printed, using its index. Then, the operator depresses the motion picture control button 28 to reproduce the selected motion picture image file to check its contents. The indices can be used to select a plurality of motion picture image files. When a motion picture image file is selected while another motion picture image file is being reproduced, the newly selected motion picture image file is reproduced for a check.

If a decisive moment image (for example, the moment when someone swings a golf club) is to be specified for printing while the motion picture image file is being reproduced, then the operator depresses the "Decisive Moment" button to specify an image as the center of the decisive moment. The specified image will be the central image of the series of frames to be printed. The specified central image is extracted for printing. Then, images corresponding to a predetermined time before and after the central image are extracted as print targets, with the remaining images not extracted for frame adjustment.

Figure 4:
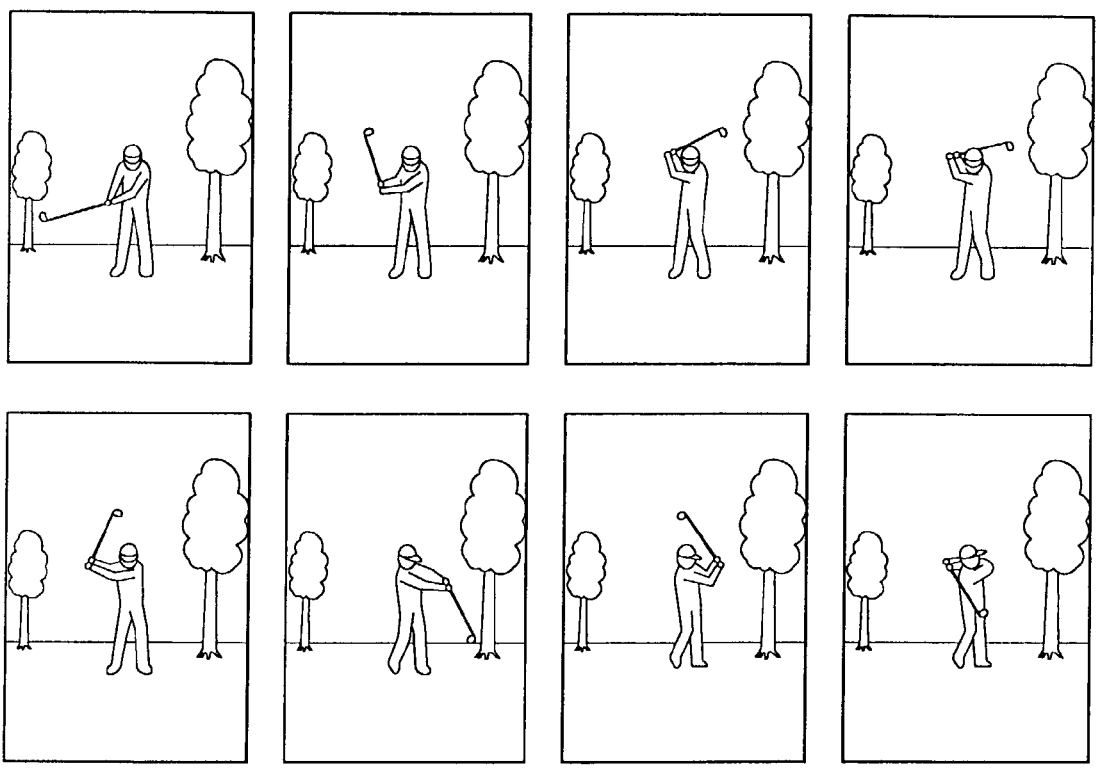
FIG. 4 is a view showing an example of a print according to a second embodiment.

The extracted images are edited on the memory 8 so as to conform to the already selected layout, on the basis of an instruction from the CPU 18 and according to software in the system memory 10. The operator depresses the preview button as required to check in the check area 26 how the images are printed. The operator then determines the number of prints (step 58), and a billing procedure is executed (step 60). Then, the edited image data is transferred to the print engine 20 for printing (step 62). An example of a print according to the present embodiment is shown in FIG. 4. In this print example, in the central image, a player holds a golf club highest above his head.

According to the printer of the second embodiment, decomposed image prints of scenes preceding and succeeding a decisive moment image are easily obtained while viewing images reproduced on the screen on the basis of digital motion picture image data. The motion picture photographer can thus enjoy prints in a new way.

In the above embodiments, motion pictures are processed. However, continuous photograph images may be processed. In this case, basically, one continuous photograph image constitutes one file. Accordingly, continuous photograph image files are associated with one another using tag data for the files or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image editing apparatus which edits continuous image data recorded on a recording medium, the apparatus comprising:

a continuous image data reading device which reads continuous image data recorded on the recording medium;

a layout setting device which sets an image edition layout of continuous images and the number of image edition frames for the continuous images;

an image display device which displays a list of one or more continuous image files recorded on said recording medium;

a continuous image file selecting device which selects a continuous image file;

an edited image setting device which enables setting of at least a desired particular frame of image to be arranged in the set layout which is designated by user's operation, while the continuous images of the selected continuous image file are reproduced to be shown simultaneously with reproduction, from among the reproduced continuous images;

an edited image extracting device which extracts images corresponding to said set number of frames and including the particular frame of image set by said edited image setting device; and an image arrangement editing device which edits the images extracted by said edited image extracting device so as to arrange the images in the set layout.

2. The image editing apparatus of claim 1, wherein the layout setting device which sets the image edition layout by obtaining user input for directly setting the layout.

3. The image editing apparatus of claim 2, wherein the edited image extracting device extracts the images according to user input.

4. The image editing apparatus of claim 3, wherein the set layout comprises a predetermined orientation on a print medium of the layout of continuous images.

5. The image editing apparatus of claim 4, wherein the set layout, further comprises setting a predetermined number of plural frames without further user input.

6. The apparatus of claim 4, wherein the set layout is selectable from multiple orientations.

7. The image editing apparatus of claim 1, where the image display device includes a means for displaying a list, wherein the list comprises an index of plural different continuous sequence of images in medium.

8. The image editing apparatus of claim 1, where the extracting images corresponds to extraction of non-consecutive images from the range of images.

9. An image editing method of editing continuous image data recorded on a recording medium, the method comprising the steps of:

reading continuous image data recorded on the recording medium;

setting an image edition layout of continuous images and the number of image edition frames for the continuous images;

displaying a list of one or more continuous image files recorded on said recording medium;

selecting a desired continuous image file from the listed files;

enabling setting of at least a desired particular frame of image arranged in the set layout which is designated by user's operation, while the continuous images of the selected continuous image file are reproduced to be shown simultaneously with reproduction from among the reproduced continuous images;

extracting images corresponding to said set number of frames and including the set particular frame of image; and editing the extracted images so as to arrange the images in the set layout.

10. The image editing method of claim 9, wherein the image edition layout is set by obtaining user input for directly setting the layout.

11. A non-transitory computer readable medium including an image editing program for editing continuous image data recorded on a recording medium, the program allowing a computer to execute the steps of:

reading continuous image data recorded on the recording medium;

setting an image edition layout of continuous images and the number of image edition frames for the continuous images;

displaying a list of one or more continuous image files recorded on said recording medium;

selecting a desired continuous image file from the listed files;

enabling setting of at least a desired particular frame of image arranged in a set layout which is designated by user's operation, while the continuous images of the selected continuous image file are reproduced to be shown simultaneously with reproduction, from among the reproduced continuous images;

extracting images corresponding to said set number of frames and including the set particular frame of image; and editing the extracted images so as to arrange the images in the set layout.

12. The non-transitory computer readable medium of claim 11, wherein the image edition layout is set by obtaining user input for directly setting the layout.

13. An image editing apparatus which edits continuous image data recorded on a recording medium, the apparatus comprising:

a continuous image data reading device which reads continuous image data recorded on the recording medium;

a layout setting device which sets an image edition layout of continuous images and the number of image edition frames for the continuous images;

an image display device which displays a list of one or more continuous image files recorded on said recording medium;

a continuous image file selecting device which selects a continuous image file;

an edited image setting device which enables setting of at least one of an edition starting image and an edition ending image from the selected continuous image file and which enables setting of at least a desired particular frame of image arranged in the set layout which is designated by user's operation within a set range of images, while the continuous images of the selected continuous image file are reproduced to be shown simultaneously with reproduction, from among the reproduced continuous images;

an edited image extracting device which extracts, if said particular image to be edited has been selected, images which correspond to the set number of frames and which include the particular frame of image within the range set by said edited image setting device; and an image arrangement editing device which edits the images extracted by said edited image extracting device so as to arrange the images in the set layout.

14. An image editing method of editing continuous image data recorded on a recording medium, the method comprising:

reading continuous image data recorded on the recording medium;

setting an image edition layout of continuous images and the number of image edition frames for the continuous images;

displaying a list of one or more continuous image files recorded on said recording medium;

selecting a desired continuous image file from the listed files;

enabling setting of at least one of an edition starting image and an edition ending image from the selected continuous image file and enabling setting of at least a desired particular frame of image arranged in the set layout to be edited within a set range of images;

extracting, if said particular frame of image which is designated by a user to be edited has been selected, images which correspond to the set number of frames and which include the particular frame of image within the set range, wherein said particular frame of image is designated by user's operation, while the continuous images of the selected continuous image file are reproduced to be shown simultaneously with reproduction, from among the reproduced continuous images; and editing the extracted images so as to arrange the images in the set layout.

15. A non-transitory computer readable medium including an image editing program for editing continuous image data recorded on a recording medium, the program allowing a computer to execute the steps of:

reading continuous image data recorded on the recording medium;

setting an image edition layout of continuous images and the number of image edition frames for the continuous images;

displaying a list of one or more continuous image files recorded on said recording medium;

selecting a desired continuous image file from the listed files;

enabling setting of at least one of an edition starting image and an edition ending image from the selected continuous image file and enabling setting of at least a desired particular frame of image arranged in the set layout which is designated by a user to be edited within a set range of images, wherein said particular frame of image is designated by user's operation, while the continuous images of the selected continuous image file are reproduced to be shown simultaneously with reproduction, from among the reproduced continuous images;

extracting, if said particular frame of image to be edited has been selected, images which correspond to the set number of frames and which include the particular frame of image within the set range; and editing the extracted images so as to arrange the images in the set layout.

16. A motion picture image print apparatus which prints digital motion picture image data recorded on a recording medium, the apparatus comprising:

a motion picture image data reading device which reads digital motion picture image data recorded on the recording medium;

a print layout setting device which sets a layout of a print output and the number of frames in the print output;

an image display device which displays a list of one or more motion picture image files recorded on said recording medium;

a motion picture image file selecting device which selects a motion picture image file to be printed;

a printed image setting device which enables setting of at least a desired particular frame of image arranged in the set layout which is designated by a user to be printed from the selected motion picture image file;

a printed image extracting device which extracts images corresponding to said set number of frames and including the particular frame of image set by said printed image setting device, wherein said particular frame of image is designated by user's operation, while continuous images of the selected motion picture image file are reproduced to be shown simultaneously with reproduction, from among the reproduced continuous images;

an image arrangement editing device which edits the images extracted by said printed image extracting device so as to arrange the images in the set layout; and an image print device which prints the edited images.

17. A motion picture image print apparatus which prints digital motion picture image data recorded on a recording medium, the apparatus comprising:

a motion picture image data reading device which reads digital motion picture image data recorded on the recording medium;

a print layout setting device which sets a layout of a print output and the number of frames in the print output;

an image display device which displays a list of one or more motion picture image files recorded on said recording medium;

a motion picture image file selecting device which selects a motion picture image file to be printed;

a printed image setting device which enables setting of at least one of a print starting image and a print ending image from the selected motion picture image file and which enables setting of at least a desired particular frame of image arranged in the set layout which is designated by a user to be printed within a set range;

a printed image extracting device, which extracts, if said particular frame of image to be printed has been selected, images which correspond to said set number of frames and which include the particular frame of image within the range set by said printed image setting device, wherein said particular frame of image is designated by user's operation, while the continuous images of the selected motion picture image file are reproduced to be shown simultaneously with reproduction, from among the reproduced continuous images; and an image arrangement editing device which edits the images extracted by said printed image extracting device so as to arrange the images in said set layout; and an image print device which prints the edited images.

* * * * *